(12) United States Patent
Kanehira et al.

(10) Patent No.: US 6,413,180 B1
(45) Date of Patent: Jul. 2, 2002

(54) POWER TRANSMITTING MECHANISM WITH SILENT CHAIN AND SPROCKETS

(75) Inventors: Makoto Kanehira; Kazumasa Matsuno; Masao Maruyama, all of Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/610,729

(22) Filed: Jul. 6, 2000

(30) Foreign Application Priority Data

Jul. 6, 1999 (JP) .......................................... 11-191858

(51) Int. Cl.⁷ ............................ F16H 55/30; F16H 7/00
(52) U.S. Cl. ...................... 474/164; 474/85; 474/152; 474/148
(58) Field of Search ................................ 474/160, 155, 474/158, 156, 212, 231, 148, 152, 153, 85, 84, 900, 219, 202, 164

(56) References Cited

U.S. PATENT DOCUMENTS

| | | | |
|---|---|---|---|
| 5,427,580 A | * 6/1995 | Ledvina et al. | 474/84 |
| 5,551,925 A | * 9/1996 | Mott et al. | 474/85 |
| 5,690,568 A | * 11/1997 | Watson | 474/152 X |
| 5,813,934 A | * 9/1998 | Patton | 474/84 |
| 5,848,948 A | * 12/1998 | Allen | 474/156 |
| 6,106,425 A | * 8/2000 | Mott | 474/156 X |
| 6,267,701 B1 | * 7/2001 | Mott | 474/164 |

FOREIGN PATENT DOCUMENTS

| | | | |
|---|---|---|---|
| GB | 2126554 | * | 3/1983 |
| JP | 213801 | * | 12/1983 |
| JP | 247858 | * | 10/1989 |
| JP | 212507 | * | 8/1998 |

* cited by examiner

*Primary Examiner*—David A. Bucci
*Assistant Examiner*—Marcus Charles
(74) *Attorney, Agent, or Firm*—Howson & Howson

(57) ABSTRACT

A power transmitting mechanism includes a first silent chain trained around teeth of a first driving sprocket and a teeth of first driven sprocket, and a second silent chain trained around teeth of a second driving sprocket and teeth of a second driven sprocket. The first and second driving sprockets are mounted in parallel relationship on a single drive shaft, and the teeth of the first driving sprocket are offset from the teeth of the second driving sprocket by one-half pitch. The pitch of the driving sprockets is a random pitch which varies in a random pattern along the circumference of the sprockets. The silent chains have a single pitch. By thus phasing the two driving sprocket, periodic meshing impact sounds emitted from the respective silent chains are canceled out or offset each other. The periodicity of the meshing impact sound is agitated by the random tooth pitch of the driving sprockets to such an extent that resonance sound is sufficiently reduced.

13 Claims, 5 Drawing Sheets

POWER TRANSMITTING MECHANISM WITH SILENT CHAIN AND SPROCKETS

BACKGROUND OF THE INVENTION

1. Field of the Invention

The present invention relates to a power transmitting mechanism including a silent chain trained around a driving sprocket mounted to a drive shaft and a driven sprocket mounted to a driven shaft.

2. Description of the Related Art

A power transmitting mechanism formed by a combination of a silent chain and sprockets is widely used in a transfer case of a four-wheel drive vehicle, a power transmitting apparatus disposed between an engine and a transmission, and a camshaft drive unit of an engine. In a power transmitting mechanism used, for example, in the transfer case, an output shaft of a transmission and a second output shaft parallel to the output shaft are each equipped with one sprocket. The second output shaft is connected to a front axle or a rear axle. A silent chain is trained around these sprockets for transmitting power from a drive shaft consisting of the output shaft of the transmission to a driven shaft formed by the second output shaft.

Noise generated in such power transmitting mechanism mainly includes a collision sound (meshing impact sound) emitted when the silent chain comes into meshing engagement with teeth of the sprockets, and a resonance sound caused by a periodic collision sound. Various technologies have been proposed to decrease the noise level, however, there is a strong demand for further reduction of the noise level.

Japanese Patent Laid-open Publication No. HEI-7-167232 discloses a combined silent-chain and sprocket system used for driving a camshaft of an engine with the aim of reducing resonance sound. The disclosed system comprises two driving sprockets mounted side by side on a single drive shaft, a driven sprocket mounted on each of two driven shafts a first silent chain trained around one driving sprocket on the drive shaft and the driven sprocket on one of the driven shafts, and a second silent chain trained around the other driving sprocket on the drive shaft and the driven sprocket on the other driven shaft.

The driving sprockets on the drive shaft have respective teeth offset or phased with respect to one another. The first and second silent chains come into meshing engagement with the corresponding driving sprockets on the drive shaft with a time difference therebetween. With this arrangement, the disclosed system can exhibit a certain effect in reducing the resonance sound.

The disclosed system seeks to reduce resonance sound by making respective tooth pitches of the driving sprockets different from each other and randomizing respective pitches of the silent chains.

However, since the sprockets and silent chains of the conventional system (power transmitting mechanism) are both made irregular in pitch, more than two differently configured link plate sets must be provided for making up a single extended silent chain. Considering that the silent chain is tailored for each individual item of equipment such as a transfer case or an engine, this requirement would result in considerable increases in the cost of dies due for press-forming of the link plate, the cost of inventory of the link plates, and the cost of assembling the silent chain.

Another problem associated with the conventional power transmitting mechanism is that since the silent chains and sprockets both have irregular pitch, the meshing timing between the silent chains and the mating sprockets tends to vary widely.

For instance, when irregularities in the sprockets and silent chains cancel out each other, an expected resonance sound reducing effect cannot be achieved. Conversely when irregularities in the sprockets and silent chains are added together, meshing impact sound becomes large due to an excessively large pitch difference existing between the sprockets and the chains. This may result in rapid wear of meshing surfaces (flanks) of the silent chains and sprockets.

In the case where the conventional power transmitting mechanism is used for driving a camshaft of a vehicle engine, the above-mentioned excessive large pitch difference caused by the added chain and sprocket irregularities greatly influences the valve timing, causing a drop in engine output.

SUMMARY OF THE INVENTION

With the foregoing drawbacks of the prior art in view, it is an object of the present invention to provide a power transmitting mechanism which is capable of reducing resonance sound without causing an increase in the level of collision sound and undue wear of a silent chain and sprockets.

Another object of the present invention is to provide a power transmitting mechanism which is economical but can sufficiently decrease the resonance sound.

According to the present invention, there is provided a power transmitting mechanism comprising first and second driving sprockets mounted to a single drive shaft, the first and second driving sprockets having a plurality of spaced teeth, the teeth of the first driving sprocket and the teeth of the second driving sprocket being of substantially identical pitch and being offset from each other by one-half pitch. The power transmitting mechanism also comprises first and second driven sprockets mounted to a single driven shaft, the first and second driven sprockets being aligned with the first and second driving sprockets, respectively, a first silent chain trained around the first driving sprocket and the first driven sprocket, and a second silent chain trained around the second driving sprocket and the second driven sprocket.

The teeth of the first driving sprocket and the teeth of the second driving sprockets have a random pitch which varies in a random pattern along the circumference of the first and second driving sprockets, and the first and second silent chains have a single pitch.

The power transmitting mechanism is particularly suitable for use in a transfer case of a four-wheel drive vehicle or a power train between an engine and a transmission, wherein power is transmitted between a single drive shaft and a single driven shaft, or in an camshaft drive mechanism of a double overhead camshaft (DOHC) engine, wherein power is transmitted between a single drive shaft and two driven shafts. In the later application, the power-transmitting operation is achieved by using either a single silent chain trained around three sprockets mounted to the respective shafts, or alternatively two silent chains one of which is trained around a driving sprocket on the drive shaft and a driven sprocket on one driven shaft, and the other silent chain being trained around a driving sprocket and a driven sprocket on the other drive shaft.

In the power transmitting mechanism, when the drive shaft is rotating, power is transmitted from the drive shaft to the driven shaft via the silent chains running around the driving and driven sprockets. Each of the silent chains generates an impact sound as it enters the corresponding sprocket from the free span of the chain. According to the present invention, the drive force is evenly shared by the two silent chains disposed side by side, the peak value of the impact sound emitted from each individual silent chain is relatively low. In addition, since the teeth of the first driving sprocket are offset from the teeth of the second driving sprocket by one-half pitch, the impact sound emitted from the first silent chain and the impact sound emitted to the other silent chain are cancel out each other. Thus, the total noise level of the power transmitting mechanism is considerably reduced.

The tooth pitch of the driving sprockets is a random pitch which varies in a random pattern along the circumference of the sprockets, while the silent chains both have a single pitch. Accordingly, the periodicity of the meshing impact sound caused by meshing engagement between each silent chain and the corresponding driving sprocket is controlled solely by variations of the tooth pitch of the driving sprocket. The tooth pitch variations of the driving sprockets are neither canceled out by, nor added with, variations of the pitch of the silent chains. It is, therefore, possible to reduce the resonance sound effectively, and prevent undue increase in the meshing impact sound and accelerated wear of the chain and sprocket contact surfaces which may occur when the pitch difference between the silent chains and the driving sprockets becomes large.

In one preferred form, some teeth of each of the first and second driving sprockets are thinned or thickened along one flank thereof by a thickness which ranges from 0.5 to 2.0% of a pitch of other teeth of each driving sprocket. It is preferable that the number of the thinned or thickened teeth is in the range of 10 to 50% of a total number of the teeth of each the driving sprocket.

In order to maintain the random pitch, it is preferable that the first and second driving sprocket are part of a single driving sprocket assembly of unitary construction, and the driving sprocket assembly is formed from a sintered metal. The one-piece driving sprocket assembly formed of a sintered metal can be manufactured at a low cost as compared to a conventional one-piece sprocket manufactured though cutting and rolling processes, and can readily maintain the offset between the first and second sprocket teeth over a longed period of use.

It is also preferable that the teeth of the first driven sprocket and the teeth of the second driven sprocket are of substantially identical pitch and are offset from each other by one-half pitch. The respective teeth of the first and second driven sprockets may have a single pitch which is uniform throughout the circumference of the driven sprockets, or a random pitch which varies. in a random pattern along the circumference of the driven sprockets. In the case where the driven sprockets have a random tooth pitch, the same noise suppressing effect as attained by the random tooth pitch of the driving sprockets can be also attained by the random pitch of the driven sprockets.

BRIEF DESCRIPTION OF THE DRAWINGS

A certain preferred embodiment of the present invention will now be described in detail, by way of example only, with reference to the accompanying drawings, in which.

DETAILED DESCRIPTION OF THE PREFERRED EMBODIMENT

The following description is merely exemplary in nature and is in no way intended to limit the invention or its application or uses.

Figure 1:
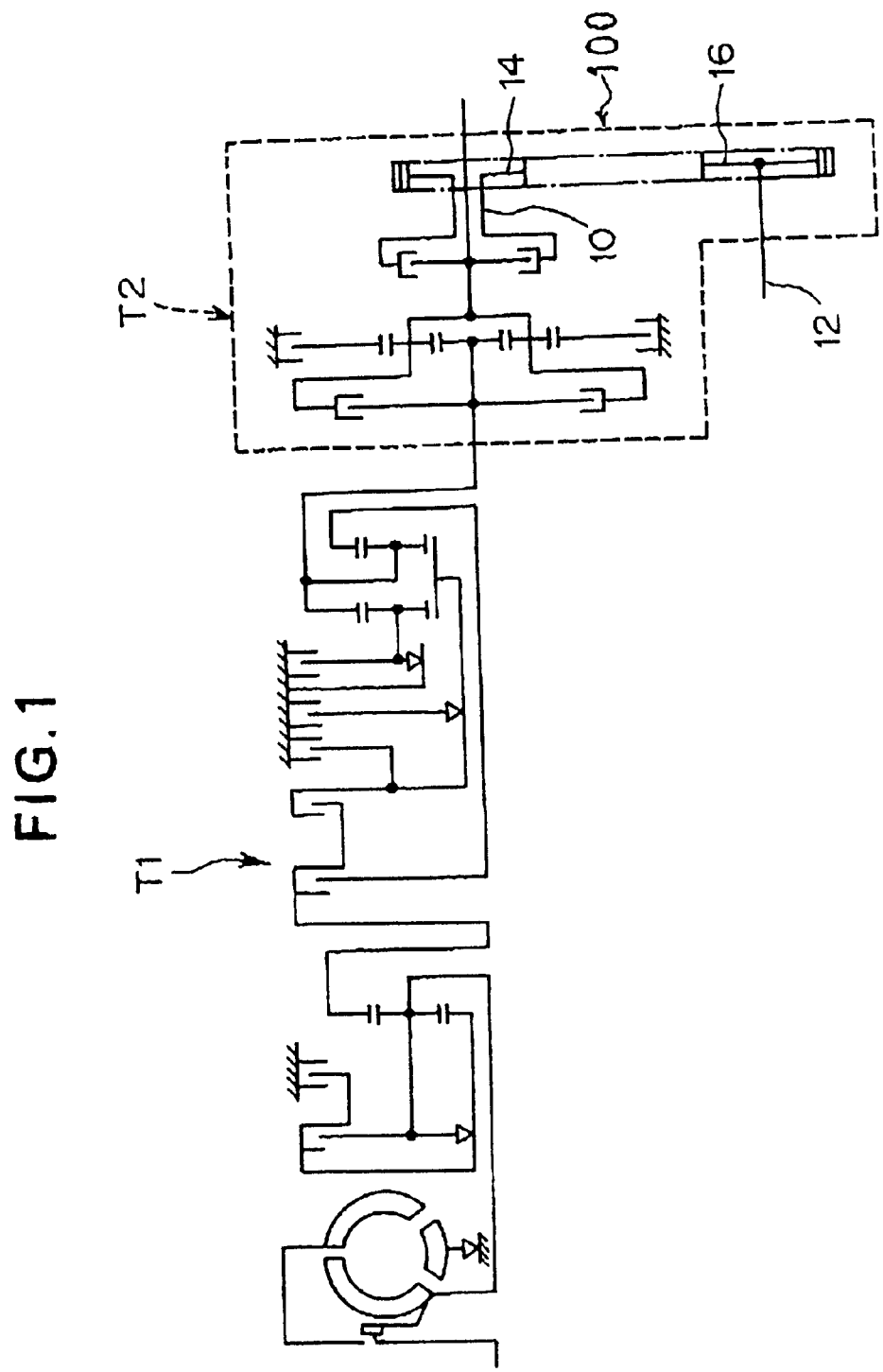
FIG. 1 is a diagrammatical view showing a power train of a part-time four-wheel drive vehicle equipped with a transmission and a transfer case in which a power transmitting mechanism according to. the present invention is incorporated.

Referring now to the drawings and FIG. 1 in particular, there is shown a transmission T1 and a transfer case T2 with reduction gear of a part-time four-wheel drive vehicle. The transfer case T2 includes a power transmitting mechanism 100 according to the present invention for transmitting power from an output shaft (not designated) to a second output shaft 12. The power transmitting mechanism 100 is particularly useful when embodied in the transfer case T2 but may be used as a power transmitting mechanism which is disposed between an engine and a transmission, or used in a camshaft drive system.

In FIG. 1 an output shaft (not designated) of the transmission T1 is connected to an input shaft (not designated) of the transfer case T2, so that power of an engine (not shown) is output from the output shaft of the transfer case T2 via a reduction mechanism (not designated) composed of a planetary gear train. The output shaft is directly connected to a rear axle of the vehicle. The output shaft is also connected to the second output shaft 12 via a clutch unit (not designated), an intermediate shaft 10 and the power transmitting mechanism 100 of the present invention, so that the engine power can be selectively transmitted from the output shaft of the transfer case T2 to the second output shaft 12 in response to the operation of the clutch unit.

Figure 2:
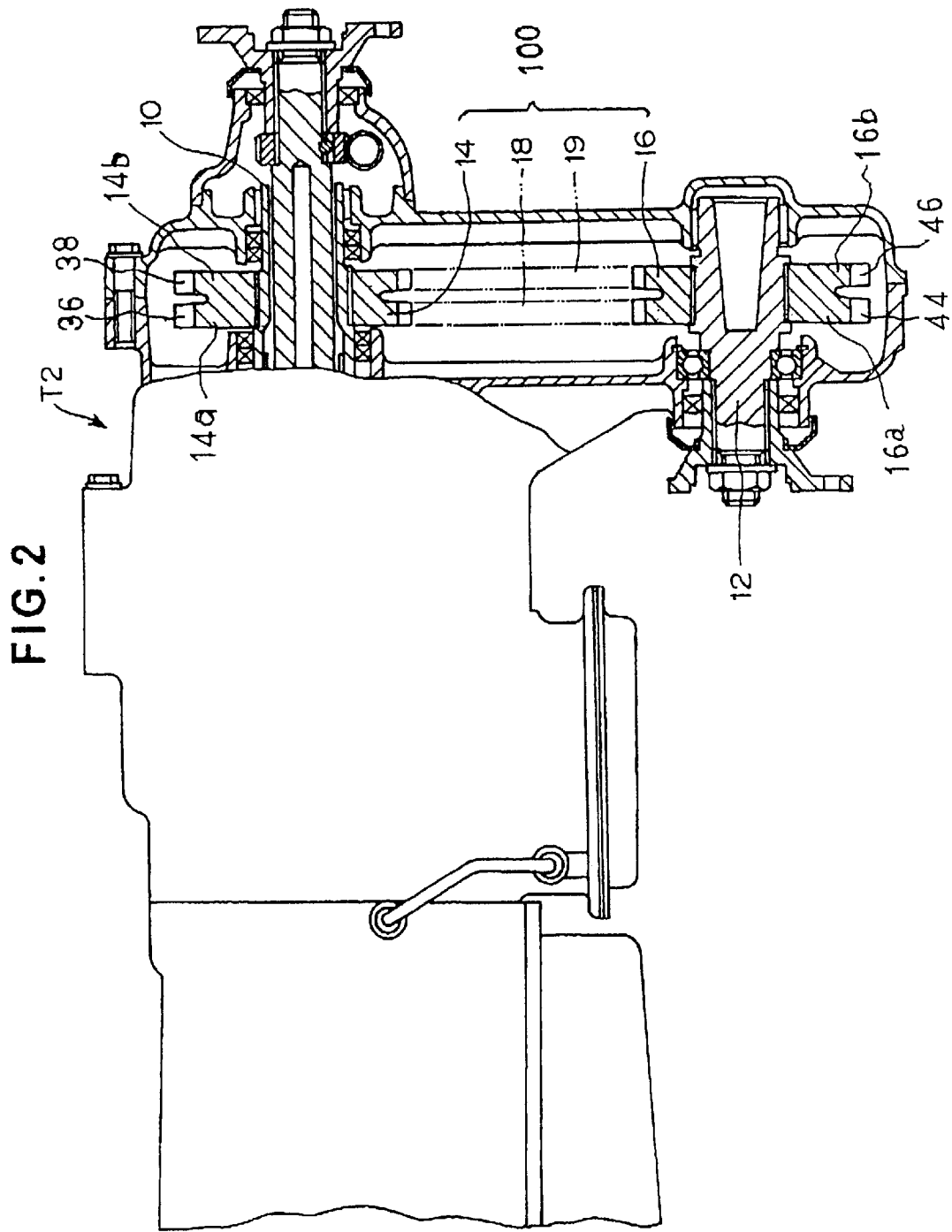
FIG. 2 is a partial cross-sectional view of the transfer case, showing the general construction of the power transmitting mechanism.

The intermediate shaft 10 and the second output shaft 12 of the transfer case T2 form a drive shaft and a driven shaft, respectively, with respect to the power transmitting mechanism 100. As shown in FIG. 2, the power transmitting mechanism 100 includes a driving sprocket assembly 14 mounted by spline connection to the drive shaft 10, a driven sprocket assembly 16 mounted by spline connection to the driven shaft 12, and two silent chains 18, 19 disposed side-by-side and trained around the driving and driven sprocket assemblies 14, 16.

Figure 3:
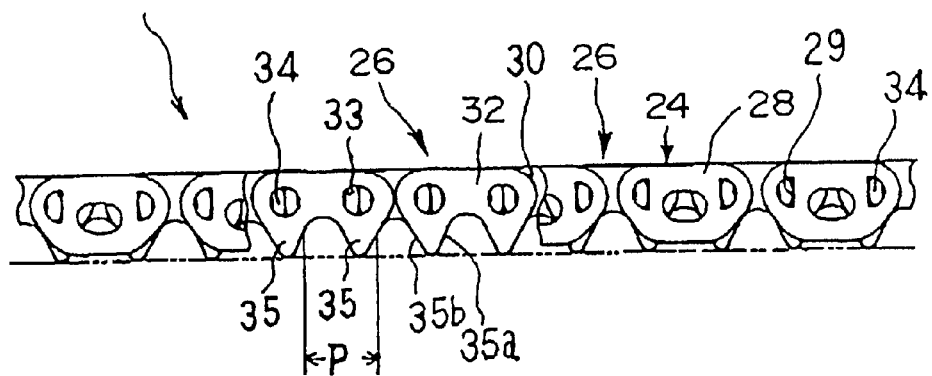
FIG. 3 is a fragmentary front elevational view, with parts cut away for clarity, of a silent chain of the power transmitting mechanism.
Figure 4:
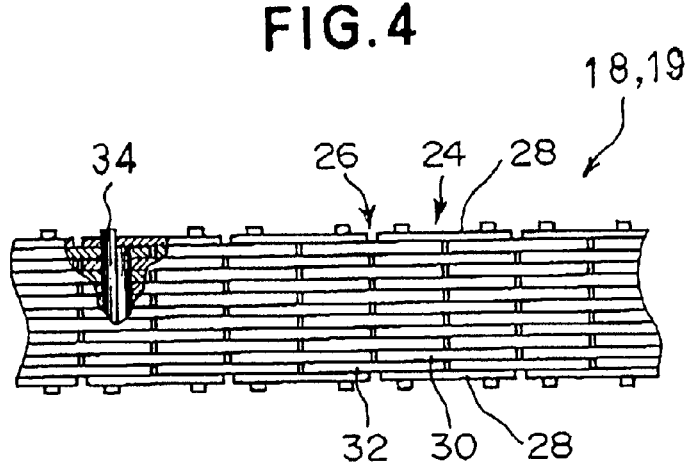
FIG. 4 is a plan view, partly in cross section, of the silent chain.

As shown in FIGS. 3 and 4, the silent chains 18, 19 each include guide links 24 and articular links 26 alternately arranged in the longitudinal direction of the silent chain 18, 19. The guide links 24 and the articular links 26 are connected together in an endless fashion.

Each of the guide links 24 has a pair of laterally spaced guide plates 28 and at least one (five in the illustrated embodiment) guide link plate 30 disposed between the guide plates 28. The guide plates 28 are slidably guided by opposite sidewalls of the sprocket assemblies 14, 16 (FIG. 2), and the guide link plates 30 are engaged in power-transmitting operation between the driving and driven sprocket assemblies 14, 16. Each of the articular links 26 has at least two (six in the illustrated embodiment) link plates 32 disposed in lateral juxtaposition for achieving the power-transmitting operation between the driving and driven sprocket assemblies 14, 16.

The guide plates 28 each have a pair of pin holes 29 (FIG. 3) spaced in the longitudinal direction of the silent chain 18, 19. The guide link plates 30 and the articular link plates 32 are identical in shape and configuration but may be different in thickness. The link plates 30, 32 each have a pair of pin holes 33 (FIG. 3) spaced in the longitudinal direction of the silent chain 18, 19. The number of the articular link plates 32 in each articular link 26 is one more than the number of the guide link plate 30 in each guide link 24.

The guide links 24 and the articular links 26 are articularly connected together by pivot pins 34 inserted through the respective laterally aligned pin holes 29, 33 of the plates 28, 30, 32. The pivot pins 34 may be comprised of a single round pin or a double rocker joint pin as shown in the illustrated embodiment.

The link plates 30, 32 each have a virtually bifurcated or V-shaped configuration to provide a pair of spaced meshing portions or teeth 3S, 35 on one longitudinal side of the link plate (corresponding to the inner circumferential side of the silent chain 18, 19). Each of the teeth 35 has an inside flank 35a and an outside flank 35b. The respective inside flanks 35a of the teeth 35 are symmetrically profiled and connected together by an arcuately concave crotch (not designated). The inside and outside flanks 35a, 35b of each tooth 35 converge together at a tip (not designated) of the tooth 35. The transmission of power between the silent chains 18, 19 and the sprocket assemblies 14, 16 (FIG. 2) is achieved via meshing engagement between the teeth 35 of the link plates 30, 32 and teeth of the sprocket assemblies 14, 16. During power-transmitting operation, the inside flanks 35a or the outside flanks 35b are brought into contact with respective engagement flanks of teeth of each sprocket assembly 14, 16.

The silent chains 18, 19 have a pitch P (FIG. 3) which is defined by the distance between a point (meshing point) where the inside flank 35a or the outside flank 35b of one tooth (leading tooth or trailing tooth) 35 of each link plate 30, 32 in one link (guide link 24 or articular link 26) is in mesh with a tooth flank of each sprocket assembly 14, 16, and a point where the inside flank 35a or the outside flank 35b of the corresponding one tooth (leading tooth or trailing tooth) 35 of each link plate 32, 30 of an adjacent link (articular link 26 or guide link 24) is in mesh with the same tooth flank of each sprocket assembly 14, 16. In one type of silent chain, meshing engagement between the silent chain and the sprocket starts along the inside flank of the chain and then shifts to the outside flank as the engagement progresses. In the silent chain of this type, the pitch is defined by corresponding points of two adjacent inside flanks. The silent chains 18, 19 of the power transmitting mechanism 100 (FIG. 2) have substantially the same pitch P and this pitch P is uniform throughout the length of the silent chains 18, 19. Here, manufacturing tolerances of the silent chains 18, 19 are not taken into consideration.

Figure 5:
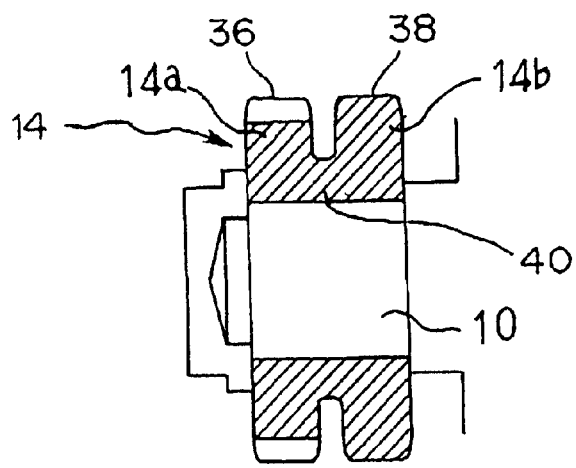
FIG. 5 is a cross-sectional view of a driving sprocket assembly used in the power transmitting mechanism.

FIG. 5 shows the driving sprocket assembly 14 which constitutes one part of the power transmitting mechanism 100 (FIG. 2) of the present invention. For purposes of illustration, the drive shaft 10 shown in FIG. 5 is illustrated in a different manner from the one shown in FIG. 2.

Figure 7:
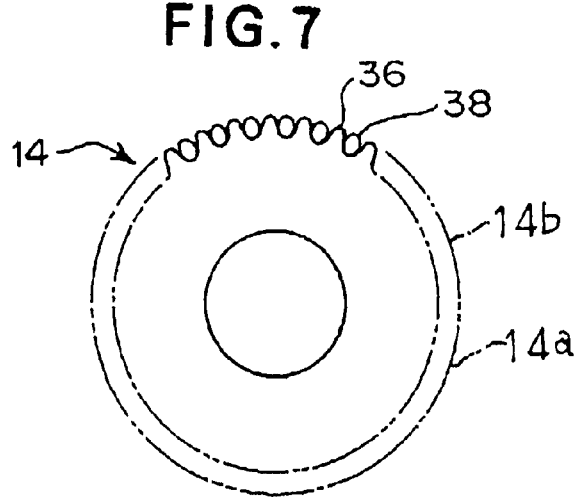
FIG. 7 is a front elevational view of the driving sprocket assembly shown in FIG. 5.
Figure 8:
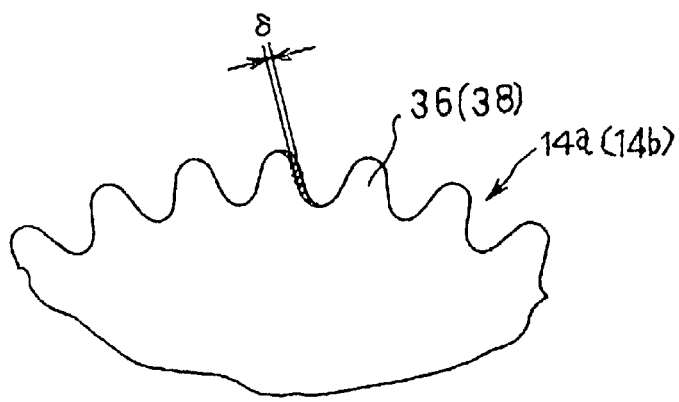
FIG. 8 is an enlarged view showing a portion of the driving sprocket assembly shown in FIG. 7.

The driving sprocket assembly 14 includes a first driving sprocket 14a and a second driving sprocket 14b formed integrally with each other. The driving sprocket assembly 14 is formed by sintering metal powders. The first and second driving sprockets 14a, 14b are disposed in parallel relationship along the drive shaft 10 and have a plurality of spaced teeth 36, 38. As shown in FIG. 7, the teeth 36 of the first driving sprocket 14a are offset from the teeth 38 of the second driving sprocket 14b by one-half pitch. The teeth 36, 38 of the first and second driving sprockets 14a, 14b are formed such that the tooth pitch is not uniform throughout the circumference of the sprockets 14a, 14b. To this end, as shown in FIG. 8, a part of the teeth 36 (38) is thinned by a thickness $\delta$ (indicated by hatching for clarity) along one flank thereof while keeping the parallelism of the thinned flank with respect to corresponding flanks of the other teeth 36 (38). As an alternative, a part 36a (38a) of the teeth 36 (38) may be thickened by the thickness $\delta$ along one flank while keeping the parallelism of the thickened flank with respect to corresponding flanks of the other teeth. The number of the thinned or thickened tooth 36a (38a) is preferably in the range of 10 to 50% of a total number of teeth 36 (38) of the driving sprocket 14a, 14b, and the thickness $\delta$ is preferably in the range of 0.5 to 2% of the reference tooth pitch (i.e., the pitch of the other teeth). If thickness $\delta$ is less than 0.5% of the reference tooth pitch, an expected resonance sound reducing effect cannot be attained due to an insufficient pitch variation provided. Alternately, if thickness $\delta$ exceeds 2% of the reference tooth pitch, variations of the pitch become excessively large, causing another problem of increased meshing impact sound and accelerated wear of contact surfaces (flanks) of the sprocket teeth 36, 38 and the chain link teeth 35 (FIG. 3). The thinned or thickened tooth 36a (38a) is arranged in random orientation along the circumference of the driving sprocket 14a (14b).

The driving sprocket assembly 14 is formed from a sintered metal, and the first and second driving sprockets 14a, 14b are joined or united together by a boss 40 of the sprocket assembly 14, with the teeth 36 of the first driving sprocket 14a being offset from the teeth 38 of the second driving sprocket 14b by one-half pitch.

Figure 6:
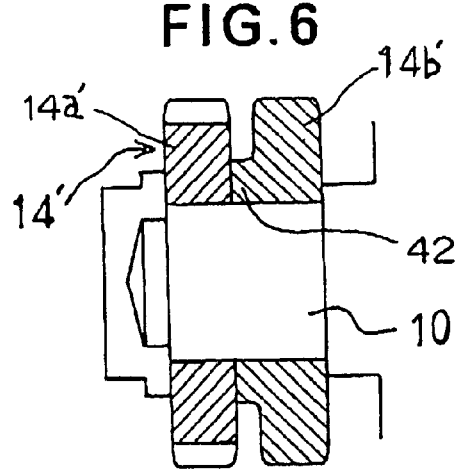
FIG. 6 is a cross-sectional view showing a modified form of the driving sprocket assembly.

FIG. 6 shows a modified form of the driving sprocket assembly 14 according to the present invention. The modified driving sprocket assembly 14' has a split or two-piece structure and includes a first driving sprocket 14a' and a second driving sprocket 14b' disposed in parallel relationship along the shaft 10 with a boss 42 of the second driving sprocket 14b' being in abutment with a sidewall (not designated) of the first driving sprocket 14a'. The first and second driving sprockets 14a', 14b' may be formed by cutting and rolling processes. Other structural details of the modified driving sprocket assembly 14' are the same as those of the driving sprocket assembly 14 described above with reference to FIG. 5, and no further description thereof is needed.

As shown in FIG. 2, the driven sprocket assembly 16 has a one-piece structure composed of a first driven sprocket 16a and a second driven sprocket 16b formed integrally with each other in the same manner as the sprockets 14a, 14b of the driving sprocket assembly 14. This means that teeth 44 of the first driven sprocket 16a are offset from teeth 46 of the second driven sprocket 16b by one-half pitch. However, the respective teeth 44, 46 of the first and second driven sprockets 16a, 16b may have a single pitch which is uniform through-out the circumference of the sprocket, or a random pitch which varies in a random pattern along the circumference of the sprocket. The first and second driven sprockets 16a, 16b are aligned with the first and second driving sprockets 14a, 14b, respectively. The driven sprocket assembly 16 may be formed by sintering, cutting, rolling or combinations thereof.

The first silent chain 18 is trained around the teeth 36 of the first driving sprocket 14a and the teeth 38 of the first driven sprocket 16a. The second silent chain 19 is trained around the teeth 38 of the second driving sprocket 14b and the teeth 46 of the second driven sprocket 16b. The first and second silent chains 18, 19 are disposed in parallel relationship and, when viewed from the axial direction of the drive and driven shafts 10, 12, these silent chains 18, 19 are disposed one behind another and apparently travel along the same path.

Figure 9:
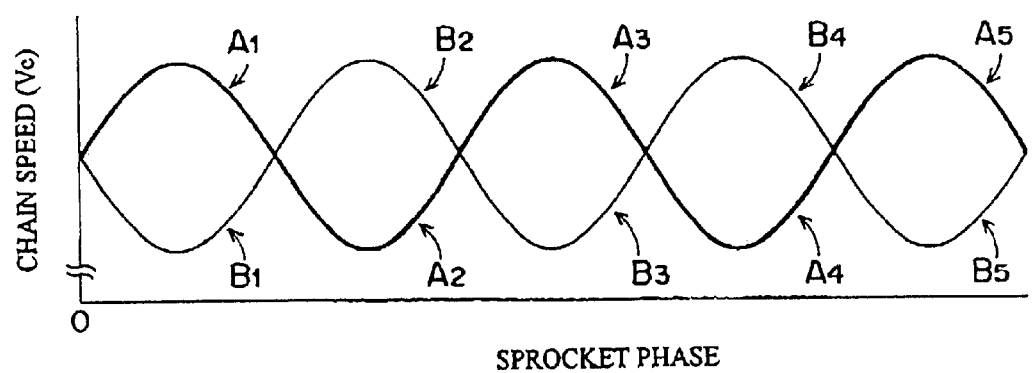
FIG. 9 is a graph showing the traveling speed of the silent chains observed when the angular speed of a drive shaft is kept constant.

Reference is next made to FIG. 9 which shows variations of the traveling speed Vc of the silent chains 18, 19 taken with respect to the phase of the first and second driving sprockets 14a, 14b when the driving sprocket assembly 14 is rotating at a constant angular velocity ωs.

As shown in FIG. 9, in every phase A1–A5, B1–B5 of the first and second driving sprockets 14a, 14b, variations in traveling speed Vc of the first silent chain 18 and variations in traveling speed Vc of the second silent chain 19 cancel out each other. This is because the teeth 36 of the first driving sprocket 14a are offset from the teeth 38 of the second driving sprocket 14b by one-half pitch, and the first and second silent chains 18, 19, disposed side by side, are driven to travel along the thus phased teeth 36, 38 of the first and second driving sprockets 14a, 14b. With this cancellation effect, it is possible to preclude possible fluctuations of the chain speed which would otherwise occur due to the chordal action of each chain 18, 19 and a corresponding pair of driven and driven sprockets 14a and 16a, 14b, 16b as the chain is driven about the sprocket pair.

In addition, since the teeth 36, 38 of the driving sprockets 14a, 14b are so shaped as to have a random pitch which varies in a random pattern along the circumference of the sprockets 14a, 14b, periodic meshing engagement between the silent chains 18, 19 and the sprocket assembly 14 is disturbed or agitated at random. With this random agitation of the periodic meshing engagement, the peak value of meshing impact sound is suppressed to a considerably low level and the period of meshing impact sound is varied at random. In addition, since the first and second silent chains 18, 19 have a single pitch, it is readily possible to match, with high accuracy, the random pitch of the drive sprocket assembly 14 with the period of meshing impact sound. With this matching, the irregularity of the meshing impact sound is made dependent solely on the random pitch of the driving sprocket assembly 14. This may further reduce of the noise.

It is important to note that two driving sprockets disposed in parallel relationship on a single drive shaft have respective rows of spaced teeth which are offset from each other by one-half pitch. Two silent chains wound around the driving sprockets have a single pitch. With this arrangement, the peak value of meshing impact sound is effectively suppressed to a low level, and the periodicity of the meshing impact sound is agitated randomly with the result that periodic resonance sound is decreased sufficiently.

Among four sprockets (two driving sprockets and two driven sprockets), only the driving sprockets are designed to have a random tooth pitch which varies in a random pattern along the circumference of the sprockets. Since the silent chains have a single pitch as discussed above, variations of the meshing impact sound are controlled solely by the variations of tooth pitch of the driving sprockets. The tooth pitch variations of the driving sprockets are not canceled at all by variations in pitch of the silent chains, thus posing a considerable reduction of the resonance sound. In addition, it is unlikely to occur that variations of the pitch of the silent chains are added to the tooth pitch variations of the driving sprockets. It is, therefore, possible to prevent an increase in the peak value of the meshing impact sound caused when the difference in pitch of the silent chains and the sprockets becomes large. Relatedly, wear of mating engagement surfaces of the sprocket teeth and the chain, which may occur due to a large pitch difference between the driving sprockets and the silent chains, can be avoided Reduction of the resonance sound can thus be achieved by properly designing the sprocket teeth. It is, therefore, no longer necessary for the silent chains to have two or more differently configured link plate sets. In other words, the silent chains of the present invention can be built up with only one set of link plates of identical configuration. The use of only one link plate design achieves considerable reductions of the manufacturing cost of the link plates, the assembling cost of the silent chains, and the inventory cost of parts of the silent chains. Being equipped with the silent chains and the sprockets described previously, a power transmitting mechanism of the present invention is highly economical and able to operate very quietly.

As in the case of the driving sprockets, respective rows of teeth of the first and second driven sprockets are offset or phased by one-half pitch, so that the chordal action of the silent chains and the driven sprockets can be effectively taken up. In the power transmitting mechanism, since the driving force is evenly shared by the first and second silent chains, the noise level of meshing impact sound smitted from each silent chain is considerably low. The power transmitting mechanism as a whole can, therefore, operate silently.

Obviously, various minor changes and modifications of the present invention are possible in the light of the above teaching. It is therefore to be understood that within the scope of the appended claims, the present invention may be practiced otherwise than as specifically described.

What is claimed is:

1. A power transmitting mechanism comprising:
   first and second driving sprockets mounted to a single drive shaft, each of said first and second driving sprockets having a plurality of spaced teeth, the teeth of said first driving sprocket and the teeth of said second driving sprocket being of substantially identical pitch and being offset from each other by one-half pitch;
   first and second driven sprockets mounted to a single driven shaft, each of said first and second driven sprockets being aligned with said first and second driving sprockets, respectively;
   a first silent chain trained around said first driving sprocket and said first driven sprocket;
   a second silent chain trained around said second driving sprocket and said second driven sprocket;
   said teeth of said first driving sprocket and said teeth of said second driving sprockets having a random pitch which varies in a random pattern along the circumference of said first and second driving sprockets; and
   each of said first and second silent chains being composed of toothed link plates, and all of the toothed link plates of each of said chains being of identical configuration, the first and second chains having substantially the same pitch, and said pitch being uniform throughout the length of each of said first and second silent chains.

2. A power transmitting mechanism according to claim 1, wherein some teeth of each of said first and second driving sprockets are thinned or thickened along one flank thereof by a thickness which ranges from 0.5 to 2.0% of a pitch of other teeth of each said driving sprocket.

3. A power transmitting mechanism according to claim 2, wherein the number of said thinned or thickened teeth is in the range of 10 to 50% of a total number of said teeth of each said driving sprocket.

4. A power transmitting mechanism according to claim 1, wherein said first and second driving sprocket are part of a single driving sprocket assembly of unitary construction, said driving sprocket assembly being formed from a sintered metal.

5. A power transmitting mechanism according to claim 4, wherein some teeth of each of said first and second driving sprockets are thinned or thickened along one flank thereof by a thickness which ranges from 0.5 to 2.0% of a pitch of other teeth of each said driving sprocket.

6. A power transmitting mechanism according to claim 5, herein the number of said thinned or thickened teeth is in the range of 10 to 50% of a total number of said teeth of each said driving sprocket.

7. A power transmitting mechanism according to claim 1, wherein the teeth of said first driven sprocket and the teeth of said second driven sprocket are of substantially identical pitch and are offset from each other by one-half pitch.

8. A power transmitting mechanism according to claim 7, wherein some teeth of each of said first and second driven sprockets are thinned or thickened along one flank thereof by a thickness which ranges from 0.5 to 2.0% of a pitch of other teeth of each said driven sprocket.

9. A power transmitting mechanism according to claim 8, wherein the number of said thinned or thickened teeth is in the range of 10 to 50% of a total number of said teeth of each said driven sprocket.

10. A power transmitting mechanism according to claim 7, wherein said first and second driven sprocket are part of a single driven sprocket assembly of unitary construction, said driven sprocket assembly being formed from a sintered metal.

11. A power transmitting mechanism according to claim 10, wherein some teeth of each of said first and second driven sprockets are thinned or thickened along one flank thereof by a thickness which ranges from 0.5 to 2.0% of a pitch of other teeth of each said driven sprocket.

12. A power transmitting mechanism according to claim 11, wherein the number of said thinned or thickened teeth is in the range of 10 to 50% of a total number of said teeth of each said driven sprocket.

13. A power transmitting mechanism according to claim 1, wherein each of said first and second silent chains includes guide links and articular links alternately arranged in the longitudinal direction of the chain, each of said guide links being composed of a pair of laterally spaced guide plates and at least one guide link plate disposed between said guide plates, each of said articular links being composed of two or more articular link plates interleaved with the guide link plates of the guide links, the number of said articular link plates being greater than the number of the guide link plates, each of the guide link plates and articular link plates being bifurcated to provide a pair of teeth which mesh with sprocket teeth and a pair of pin holes through which pivot pins are inserted.

* * * * *

UNITED STATES PATENT AND TRADEMARK OFFICE
CERTIFICATE OF CORRECTION

PATENT NO. : 6,413,180 B1
DATED : July 2, 2002
INVENTOR(S) : Makoto Kanehira et al.

It is certified that error appears in the above-identified patent and that said Letters Patent is hereby corrected as shown below:

Column 3,
Line 10, delete "are";
Line 34, delete "the";
Line 66, delete "." after -- to --;

Column 5,
Line 29, change "3S" to -- 35 --;

Column 6,
Line 17, change "5" to -- δ --;

Column 7,
Line 54, delete "of";

Column 8,
Line 35, change "smitted" to -- emitted --.

Signed and Sealed this

Thirty-first Day of December, 2002

JAMES E. ROGAN
*Director of the United States Patent and Trademark Office*